United States Patent [19]
Klontz et al.

[11] Patent Number: 5,341,083
[45] Date of Patent: * Aug. 23, 1994

[54] CONTACTLESS BATTERY CHARGING SYSTEM

[75] Inventors: Keith W. Klontz, Sun Prairie; Deepakraj M. Divan, Madison; Donald W. Novotny, Madison; Robert D. Lorenz, Madison, all of Wis.

[73] Assignee: Electric Power Research Institute, Inc., Palo Alto, Calif.

[*] Notice: The portion of the term of this patent subsequent to Oct. 20, 2009 has been disclaimed.

[21] Appl. No.: 963,590

[22] Filed: Oct. 20, 1992

Related U.S. Application Data

[63] Continuation-in-part of Ser. No. 766,756, Sep. 27, 1991, Pat. No. 5,157,319.

[51] Int. Cl.$^5$ .................. H01M 10/46; H01F 27/00
[52] U.S. Cl. .................................. 320/2; 336/58; 336/DIG. 2
[58] Field of Search ............... 320/2; 336/58, DIG. 2

[56] References Cited

U.S. PATENT DOCUMENTS

| | | | |
|---|---|---|---|
| 1,827,191 | 10/1931 | Casper | 336/195 X |
| 1,844,501 | 2/1932 | Davis | 336/195 X |
| 2,175,363 | 10/1939 | Roberts | 333/34 X |
| 2,181,899 | 12/1939 | Kennedy | 336/195 X |
| 2,348,325 | 5/1944 | Brown | 336/195 X |
| 2,375,591 | 5/1945 | Schweitzer, Jr. | |
| 2,382,435 | 8/1945 | Mann et al. | 336/195 X |
| 2,430,640 | 11/1947 | Johnson | 336/195 X |
| 2,669,603 | 2/1954 | Prache | 333/243 X |
| 3,005,965 | 10/1961 | Wertanen | 336/195 X |
| 3,066,266 | 11/1962 | Fisher | 336/229 X |
| 3,195,076 | 7/1965 | Morrison | 336/181 X |
| 3,197,723 | 7/1965 | Dortort | 336/181 X |
| 3,260,977 | 7/1966 | Coltman | 336/181 |
| 3,263,191 | 7/1966 | Arvonio et al. | 333/24 |
| 3,449,703 | 6/1969 | Steen | 336/181 X |
| 3,453,574 | 7/1969 | de Parry | 336/195 X |
| 3,870,942 | 3/1975 | Boese et al. | 320/2 |
| 3,996,543 | 12/1976 | Conner et al. | 336/58 |
| 4,386,280 | 5/1983 | Ricaud et al. | 336/176 X |
| 4,496,821 | 1/1985 | Burgher et al. | 336/96 X |
| 4,656,412 | 4/1987 | McLyman | 320/39 |
| 4,901,069 | 2/1990 | Veneruso | 336/DIG. 2 X |
| 4,913,258 | 4/1990 | Sakurai et al. | 180/242 |
| 4,953,726 | 9/1990 | Loutan | 74/50 X |
| 5,157,319 | 10/1992 | Klontz et al. | 320/2 |

OTHER PUBLICATIONS

M. S. Rauls, D. W. Novotny, and D. M. Divan, "Design Considerations For High Frequency Co-Axial Winding Power Transformers," *IEEE-IAS 1991 Conference Record*, Oct. 1991, pp. 946-952.

E. T. Bowers, "Safety Aspects of Pneumatic Transport," Bureau of Mines Information Circular No. 9006, U.S. Dept. of Interior, pp. 6-20, 1985.

(List continued on next page.)

*Primary Examiner*—R. J. Hickey
*Attorney, Agent, or Firm*—Flehr, Hohbach, Test, Albritton & Herbert

[57] ABSTRACT

A contactless recharging system and method for recharging a battery storage device onboard an electric vehicle has a primary converter station for converting power from a power source into high frequency power at a selected charging rate. The vehicle has a secondary converter for converting high frequency power into DC power to charge the battery. The converters are coupled together by a contactless coupling of a conductor loop and a coupling link forming a coaxial winding transformer. The coupled link and loop carry a communication indicating the selected charging rate of the battery. The link has a magnetic core and a core-mounted conductor at least partially surrounded by the core. The core-mounted conductor selectively at least partially surrounds a portion of the loop to transfer power therebetween. The core-mounted conductor is coupled to one of the converters, and the loop is coupled the other converter.

20 Claims, 7 Drawing Sheets

OTHER PUBLICATIONS

K. Lashkari, S. E. Schladover, and E. H. Lechner, "Inductive Power Transfer to an Electric Vehicle," 8th International Electric Vehicle Symposium, Washington, D.C., Oct. 1986.

E. H. Lechner and S. E. Schladover, "The Roadway Powered Electric Vehicle—An All-electric Hybrid System," 8th International Electric Vehicle Symposium, Washington, D.C., Oct. 1986.

S. E. Schladover, "Systems Engineering of the Roadway Powered Electric Vehicle Technology," 9th International Electric Vehicle Symposium, Toronto, Ont. Canada, Nov., 1988.

M. H. Kheraluwala, D. W. Novotny, D. M. Divan, "Design Considerations for High Frequency Transformers," *IEEE-PESC-90 Record*, pp. 734-742.

HLN Weigemann, D. W. Novotny, D. M. Divan, R. Mohan, "A ZVS Dual Resonant Converter for Battery Charging Applications," Power Electronics Specialists Conference, 1991.

F. C. Schwarz, J. B. Klaassens, "Controllable 45-kW Current Source for DC Machines," *IEEE Transactions Industry Applications*, vol. IA-15, No. 4, Jul/Aug. 1979, pp. 437-444.

D. M. Divan, G. Venkataramanan, R. DeDoncker, "Design Methodologies for Soft Switched Inverters," *IEEE-IAS 1988 Conference Record*, pp. 758-766.

J. M. Hillhouse, "EV's Downunder—Electric Vehicles in Mining," 10th International Electric Vehicle Symposium, Hong Kong, Dec. 1990.

A. Esser, H. C. Skudelny, "A New Approach to Power Supplies for Robots," *IEEE Transactions on Industry Applications*, vol. 27, No. 5, Sep./Oct., 1991, pp. 872-875.

K. W. Klontz, D. M. Divan, D. W. Novotny, R. D. Lorenz, "Contactless Power Delivery for Mining Applications," *IEEE-IAS 1991 Conference Record*, pp. 1263-1269.

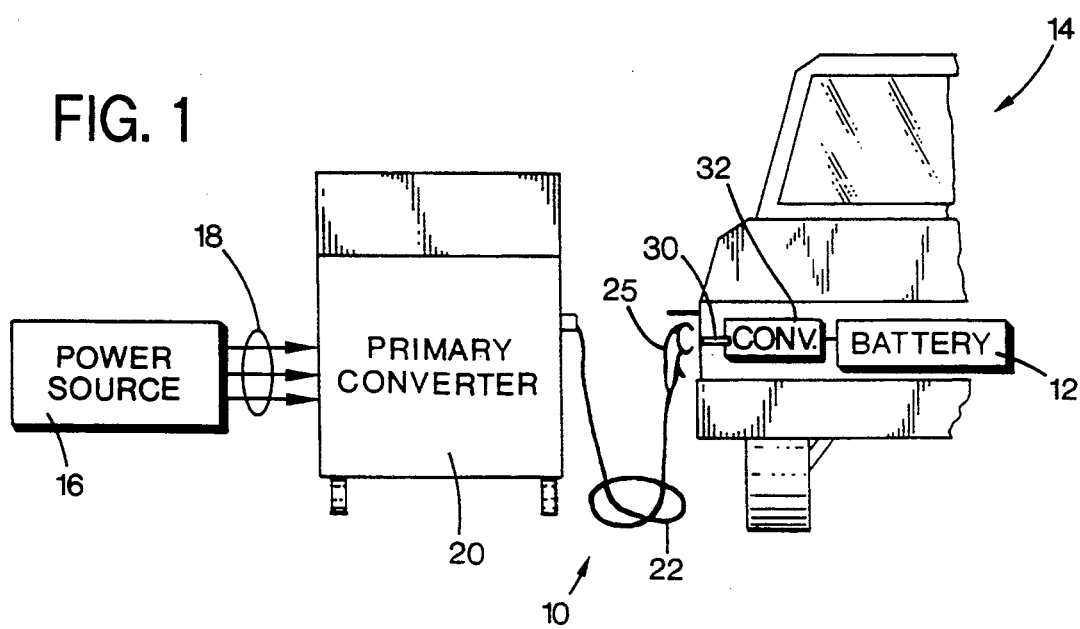
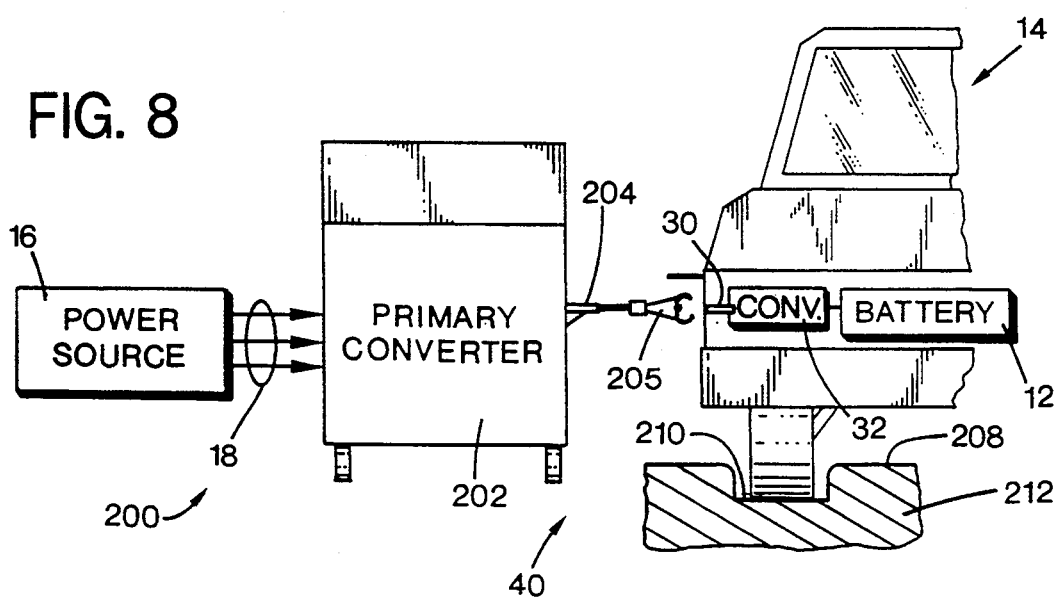
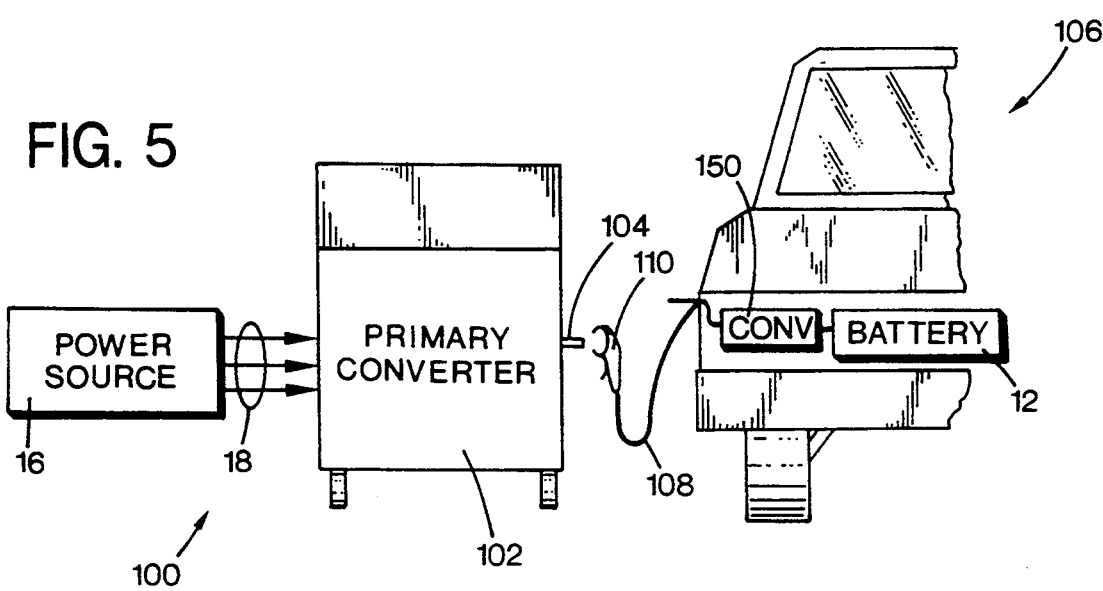

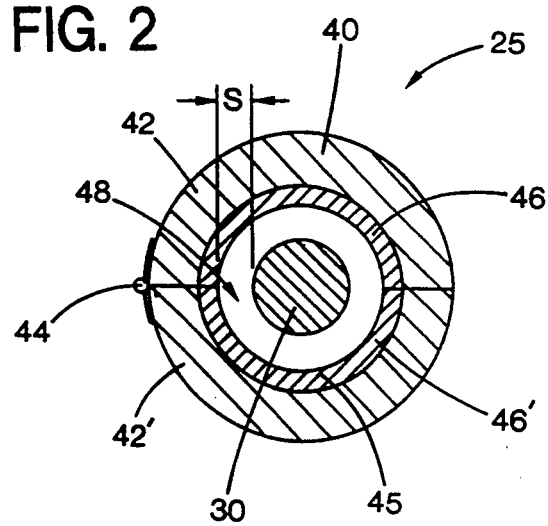
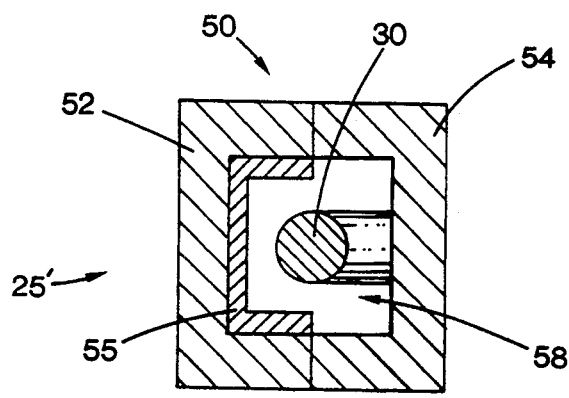
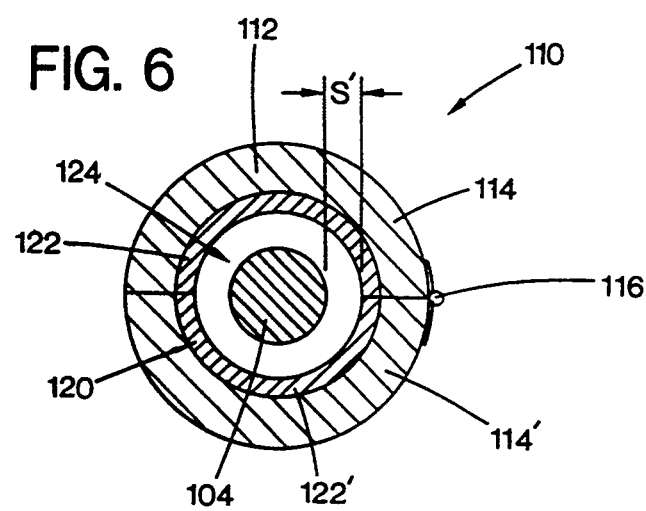

CONTACTLESS BATTERY CHARGING SYSTEM

This application is a continuation-in-part of co-pending application Ser. No. 07/766,756, filed Sep. 27, 1991, issued as U.S. Pat. No. 5,157,319 on Oct. 20, 1992, having the same inventors, and which is hereby incorporated by reference.

BACKGROUND OF THE INVENTION

The present invention relates generally to battery recharging systems, and more particularly to an improved contactless battery recharging system, such as may be used in electric vehicles and the like to enhance safety, reliability and user convenience.

Given the anticipated proliferation of electric vehicles, it will be necessary to have a distributed and reasonably standardized recharging configuration, located at, for instance, the vehicle operator's residence, place of business, parking garages, recharge stations, and the like. In determining the standardized system that will be implemented on a large scale basis, the important considerations are initial cost, operating cost, reliability, and user safety.

Using currently available technology, the most likely approach for battery recharging would be a conductor metal-to-metal contact in a plug and socket arrangement supplying alternating current (AC) or direct current (DC) power to the vehicle. Charging would be accomplished by the vehicle operator physically making the connection between the vehicle and the power supply outlet. Given the high currents and voltages required to recharge electric vehicles for operation, this connection by an untrained and unskilled operator could create unnecessary hazards, particularly if no means were provided for a quick automatic disconnect of the vehicle from the charging source. Furthermore, the need for providing charging opportunities at distributed locations as mentioned above, would be impacted by these same concerns.

Other drawbacks include higher curb weight for the electric vehicle, wear and tear of high current exposed contacts, as well as the safety issues, particularly under fault modes and owner misuse. More importantly, the public perception of reduced safety with live high power contacts may adversely impact customer acceptance of electric vehicles. The high probability that standards and safety organizations, such as Underwriters Laboratories, may require galvanic isolation between an AC power source and the vehicle battery, raises the prospect that expensive isolated converters would be needed.

Thus, a need exists for a contactless battery recharging system, such as may be used to provide power to electric vehicles, which is directed toward overcoming, and not susceptible to, the above limitations and disadvantages.

SUMMARY OF THE INVENTION

According to one aspect of the present invention, a contactless recharging system and method for recharging an energy storage device onboard an electric vehicle has a primary converter for converting power from a power source into high frequency power. A secondary converter on board the vehicle is coupled to the battery for converting high frequency power into charging power supplied to the energy storage device. The primary and secondary converters are coupled together by a contactless coupling of a conductor loop and a coupling link forming a coaxial winding transformer. The coupling link has a magnetic core and a core-mounted conductor at least partially surrounded by the magnetic core. The core-mounted conductor selectively at least partially surrounds a portion of the conductor loop to transfer power therebetween. The core-mounted conductor is coupled to either the primary or the secondary converter, with the conductor loop being mounted to the other of the primary and the secondary converters.

An overall object of the present invention is to provide a battery recharging system and method for use in recharging electric vehicle batteries.

A further object of the present invention is to provide a coupling link for coupling an electric vehicle with a power source.

An additional object of the present invention is to provide a battery recharging system which enhances user safety, increases convenience, decreases recharging time, and increases battery recharge efficiency and battery life over earlier systems.

Another object of the present invention is to provide a battery recharging system for electric vehicles which has high reliability and may be installed and used at a reasonable cost.

The present invention relates to the above features and objects individually as well as collectively. These and other objects, features and advantages of the present invention will become apparent to those skilled in the art from the following description and drawings.

BRIEF DESCRIPTION OF THE DRAWINGS

FIG. 1 is a partially schematic rear elevational view of one form of a contactless recharging system of the present invention for recharging an energy storage device, such as a battery on-board an electric vehicle;

FIG. 2 is a radial sectional view of one form of a separable coupling link of FIG. 1;

FIG. 3 is a radial sectional view of one form of an alternate separable coupling link of the present invention;

FIG. 5 is a partially schematic rear elevational view of an alternate form of a contactless recharging system of the present invention;

FIG. 6 is a radial sectional view of one form of a separable coupling link of FIG. 5;

FIG. 8 is a partially schematic rear elevational view of another alternate form of a contactless recharging system of the present invention;

DETAILED DESCRIPTION OF THE PREFERRED EMBODIMENTS

Figure 4:
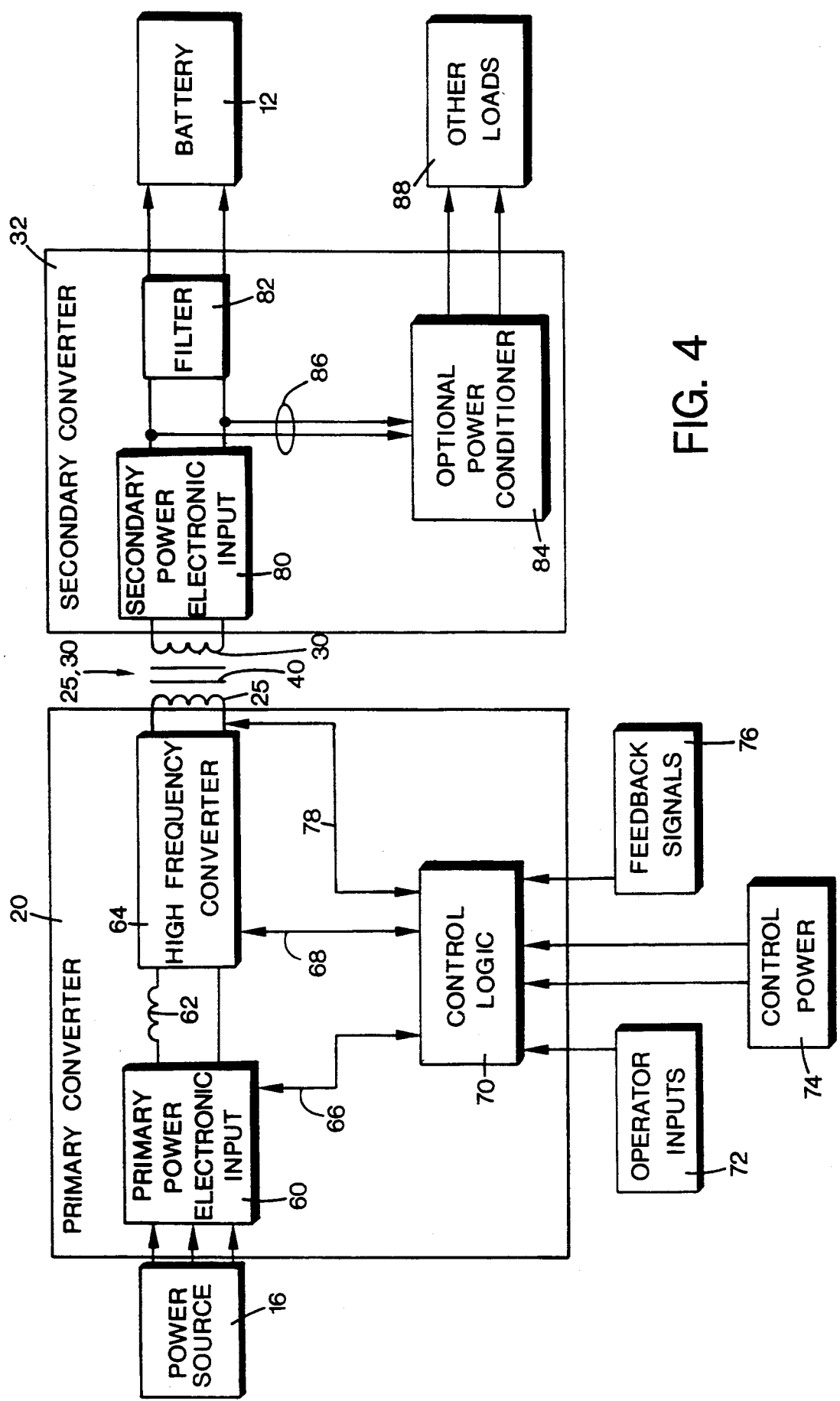
FIG. 4 is a schematic block diagram of one form of the contactless recharging system of FIG. 1.

Several alternate embodiments of a contactless charging system are illustrated below for charging an energy storage device. The embodiments are illustrated in terms of charging a DC battery 12 on board an electric vehicle. It is apparent to those skilled in the art, that the contactless charging systems described herein may be used for charging other energy storage devices and mechanisms, such as mobile robots and space vehicles.

First Embodiment

FIG. 1 illustrates an embodiment of a contactless recharging system 10 constructed in accordance with the present invention for supplying charging power for recharging an energy storage device, such as a battery system or battery 12 of an electric vehicle 14. While the energy storage device is illustrated for simplicity as a battery 12, it is apparent that the recharging systems described herein may be used to recharge any other type of energy storage device, such as a superconducting magnetic energy storage device, an electromagnetic flywheel, and the like. It is apparent that the electric vehicle embodiment is provided merely by way of example herein and this system may be used with any electrical load having internal or onboard energy storage capability.

The recharging system 10 receives power from an electrical power source 16, via conductors 18. The power source 16 may be a single phase or a polyphase alternating current (AC) source or a direct current (DC) source as desired for a particular application. A primary converter, such as a high frequency current source converter 20, converts power received from the source 16, such as AC power at a line frequency (60 Hz in the United States) to a high frequency, for instance, on the order of 2–50 kHz. The operation of the various components of the recharging system 10, such as primary converter 20, is discussed further below after an overview of the operational interrelationship between the various components.

The high frequency AC power from the primary converter 20 is delivered by a tethering conductor or tether 22 to coupling means, such as a coupling sheath or link 25 described further below (see FIGS. 2 and 3). The link 25 is configured to clamp onto a secondary power pickup conductor loop 30 mounted to vehicle 14. The term contactless as used herein means without any electrical contact between two conductors, other than magnetic coupling between the conductors. When link 25 is coupled with conductor loop 30, the structure thusly formed is referred to herein as a coaxial winding transformer (CWT) and may be analyzed using various theories from the current-transformer field.

The secondary loop 30 is coupled to a secondary converter 32. The converter 32 converts the high frequency AC power received from the primary converter 20 via link 25 and loop 30 into charging power, which is used to charge the vehicle battery 12. This charging power may be either AC or DC power or a combination thereof, such as AC power superimposed over a DC waveform. The particular type of charging power used in a given application is dictated by the energy requirements of the particular energy storage device being recharged.

The recharging system 10 may be operated by a method similar to a conventional gas pump at a roadside service station. The vehicle driver parks vehicle 14 adjacent to the primary converter 20 and couples the tethered link 25 with the power pickup loop 30 mounted to vehicle 14. After manually clamping link 25 to the vehicle power pickup 30, the primary converter includes control logic which verifies that the circuit is correct before beginning delivery of the high frequency AC power. The high frequency AC power received by pickup 30 from link 25 is converted into charging power by the secondary converter 32 and used to charge the battery 12.

Referring to FIG. 2, an illustrated embodiment of the coupling link 25 is shown coupled with the conductor loop 30 to form a CWT. The link 25 includes a separable magnetic core 40, illustrated as being split into two core portions or segments 42 and 42', which are pivoted together at hinge 44. The core segments 42 and 42' may be joined by a variety of other means (not shown) and openable by motion in other manners, such as by translational motion rather than pivotal motion, or some combination thereof. Furthermore, the coupling of link 25 with loop 30 may be accomplished by an opening type of motion by loop 30 (not shown) to receive link 25.

The link 25 also has a core-mounted conductor 45, illustrated as being split into two conductor portions or segments 46 and 46'. In the illustrated embodiment, conductor 45 is a solid tubular member, such as of copper. However, it is apparent that a plurality of discrete conductors may be used to form conductor 45, for instance, with the discrete conductors evenly distributed about the inner surface of the core to provide a substantially uniform distribution of current. Each of the conductor segments 46 and 46' are carried by core segments 42 and 42', respectively. With link 25 closed, as shown in FIG. 2, there are two minimal air gaps where core segments 42 and 42' abut. Also with link 25 closed, conductor 45 defines an interwinding region 48 within link 25. With the conductor loop 30 located in the interwinding region 48, an interwinding space S may be defined as between the conductor loop 30 and the core-mounted conductor 45.

When the link 25 is energized, instantaneous current (not shown) flows in opposite directions through the conductor loop 30 and the core-mounted conductor 45. That is, when the current is flowing in conductor loop 30 in a direction into the paper, current is flowing in conductor 45 in a direction oriented out of the paper.

While omitted for clarity in the FIG. 2, the conductor loop 30 is an insulated conductor having an inner portion of a conductive material surrounded by an outer layer of an insulative material. Similarly, the conductor 45 is also of a conductive material surrounded by insulation (not shown). The conductor 45 includes insulation adjacent the interwinding region 48 and between the conductive portion of conductor 45 and the core 40. The core 40 also has insulation (not shown) around its outer periphery. Additionally, the core 40 may have an outer covering (not shown) of a resilient, and durable material to protect the link 25 from damage during use.

Referring to FIG. 3, an alternative embodiment of the link in FIG. 1 is shown as link 25'. The link 25' includes a separable or split core 50, illustrated as having two core segments 52 and 54. The core segment 52 carries a core-mounted conductor 55, illustrated as a C-channel member, for instance of solid copper. It is apparent that conductor 55 may also be comprised of a plurality of discrete members as described above for conductor 45 of FIG. 2. Referring to FIG. 1, the core-mounted conductor 55 may be coupled to the primary converter 20 by a conductor (not shown) within tether 22.

The core segment 54 is preferably mounted to the vehicle 14 on a permanent basis. Core segments 52 and 54 are each configured to abut one another to form a flux path of magnetic material having two minimal air gaps where core segments 42 and 42' abut. When the two core segments 52 and 54 are brought together into abutment, this flux path surrounds the conductor loop 30.

The illustrated conductor 30 passes freely in front of the core segment 54, extending through the interwinding region to mounting points (not shown) on the vehicle 14, and then electrically coupling to the converter 32. Alternatively, the conductor loop 30 may be supported from core segment 54 by a support (not shown) of an insulative material. When the core segments 52 and 54 are drawn together as shown in FIG. 3, they define therebetween an interwinding region 58 substantially surrounding an axial portion of the conductor loop 30.

In operation, a mechanical latching mechanism or device (not shown) may be used to secure the two core segments 52 and 54 together. However, when energized, the two core segments 52 and 54 are advantageously drawn together by the attendant magnetic forces, as are the core segments 42 and 42' of FIG. 2, when the net currents flowing through the conductors 30 and 55 are opposing. In other words, when the flux in each core segment is flowing in the same direction, these magnetic forces will draw the core segments together. Conversely, when the fluxes in each core segment are opposed, the core segments will be repelled from one another. These attractive forces advantageously assist in initiating and maintaining the coupling joint of the core segments, and thus, of the conductor segments. Furthermore, by using opposing flux flows, the forces may be used to repel the core segments and provide for controlled decoupling of the charging link.

FIG. 4 illustrates a method of operation of primary converter 20 and secondary converter 22, with the link 25 and conductor loop 30 shown schematically. The approach described herein uses power electronics to optimize system performance and to meet currently realized practical design considerations. In the illustrated embodiment, the power source 16 supplies power to primary converter 20. If the power supplied by source 16 is AC power, illustrated as three-phase AC power in FIG. 4, the converter 20 includes a primary power electronic input stage 60. The primary input stage 60 may be a conventional thyristor rectifier bridge using thyristors, transistors, gate turnoff thyristors (GTO's), and the like to convert the received AC power into DC power.

At power levels of commercial interest, such as greater than one megawatt (1 MW), for large vehicles or short recharge times, or at levels of 1-10 kW for passenger vehicles, one cost effective approach involves using a power electronics converter with a thyristor rectifier as the primary input stage. For the lower charging levels, a voltage source converter with transistor devices may be a preferred embodiment. The rectifier provides DC power to a choke coil 62 which together serve as a DC current source for a high frequency converter 64. The high frequency converter 64 may be any type of invertor capable of providing a high frequency output, such as a current source invertor. The converter 64 has a plurality of switching devices arranged and controlled as known in the art to provide a desired high frequency output to link 25. If the power source 16 supplies DC power to primary converter 20, the primary input stage 60 may advantageously be omitted.

The primary input stage 60 and the high frequency converter 64 each may receive respective control signals 66 and 68 from a control logic unit 70, which may be a microprocessor based device. The control logic unit 70 receives various operator inputs 72, such as a "begin conducting" or "on" switch signal.

Control power 74 is provided to the control logic unit 70, such as DC power required for a digital control system. The control logic unit 70 may also receive feedback signals 76, including: signals from current transducers (not shown) monitoring charging at the battery load 12 and the output of the high frequency convertor 64 as applied to link 25; a signal from a microswitch sensor (not shown) indicating that the link 25 is coupled to the conductor coil 30, indicating a "ready to charge" signal; and the like.

The control logic unit 70 may generate a communication or control signal 78. The control signal 78 may be sent to the secondary converter 32, or converter 32 may provide a feedback signal to control logic 70 via the communication signal 78. The communication or control signal 78 is typically sent at a much higher frequency than the power provided by high frequency converter 64. For example, the control signal 78 may be on the order of a megahertz frequency signal. Such transmission of control signals is routinely accomplished by utilities transmitting control signals over power transmission lines.

The secondary converter 32 has a secondary power electronic input stage 80 which receives power from conductor loop 30. The secondary input stage 80 converts the high frequency power transferred through link 25 into AC and/or DC power, or a combination of AC an DC power, as dictated by the needs of the battery 12. The required output power provided by the primary input stage 80 is filtered by filter 82 then supplied as charging power to the battery 12. Of course, if the energy storage device requires AC charging power, or a combination of AC and DC charging power, the power electronics of the secondary input stage 80 may be modified as known in the art to provide the required charging power.

The secondary converter 32 may include an optional power conditioner 84 which receives power from the output side of the secondary input stage 80 via conductors 86. However, it may be advantageous in some applications to tap the high frequency power received by conductor 30 before rectification at the input side of the secondary input stage 80. The power conditioner 84 provides power as required by other loads 88 which are typically mounted on-board the vehicle 14. To serve the needs of the other loads 88, the power conditioner 84 may be a bridge rectifier for a DC output, an AC/DC controlled convertor for variable DC output, or an AC/AC cycloconverter for variable AC output. The other loads 88 powered by conditioner 84 may be AC or DC loads, or some combination thereof.

For example, if the vehicle 14 is a motor home, the occupants may wish to watch television, cook on an electric stove, and/or use other electrical appliances in the motor home while the motor home battery 12 is being charged. Other loads 88 may also include: auxiliary relays for the battery recharging system 10; an electronic latching mechanism insuring that link 25 remains closed around conductor 30 during charging; a battery monitoring system to monitor the charging level of battery 12, such as a state-of-charge indicator; and a ventilation fan for a battery 12 enclosed within a small confined space.

In recharging system 10, control of the power delivered to the battery 12 may be achieved from the primary convertor 20 without feedback if there are no other loads 88. For example, the secondary convertor 32 and battery 12 may be monitored and controlled by the communication signal 78. Signal 78 is injected into the core-mounted conductor 45 and induced into the secondary conductor loop 30 of link 25, which serves as a carrier. This alternate embodiment of recharging system 10 has the least cost for the mobile equipment of the embodiments discussed herein. Additionally, the primary convertor 20 may deliver power in an open loop mode, that is without feedback, by controlling current flowing in the primary core-mounted conductor 45. Monitoring, control and protection signals may be achieved without the need for a separate control wire coupling between the primary convertor and vehicle 14.

The recharging system 10 may also handle multiple loads, which appear to the primary convertor 20 as series impedances. The convertor 20 regulates the current, and voltages change to accommodate any changes in the battery load 12 and other loads 88. Such a system may have some on-board control of the current delivered to battery 12 using the secondary converter 32. Even for a singular energy storage device, on-board control, in addition to the main control logic unit 70, is preferred. This is a preferred implementation because it provides greater flexibility and the ability to accommodate diverse battery types, manufacture variations, and equipment specification variations.

The advantages of the recharging system 10 include having a very simple structure incorporated into vehicle 14, that is, a power pickup loop 30 and the converter 32. Thus, system 10 can be implemented with minimal cost and complexity, either as a retrofit or in new vehicles. Further, this structure may be standardized for various vehicle models, and may be adapted with a minimum investment by the vehicle manufacturer and owner. Additionally, the control and protection features are provided by the stationary equipment, that is, by the primary converter 20. The owner of the stationary converter 20 provides maintenance and updates for the control equipment. Furthermore, this system may be readily accepted by the public, due to its close analogy to the conventional gas pump station.

One possible drawback to system 10 over the other embodiments discussed further below is that each stationary power supply location may require revised control logic and updates as technology evolves. With the system 10, the supplier of the energy has a maximum investment in the converter and control logic. Additionally, system 10 is less flexible regarding the vehicle owner's choice of recharge locations, unless the industry and commercial infrastructure completely standardize on this system. Furthermore, the operator of the electric vehicle 14 is more dependent upon the owner and operator of the converter station to provide a proper recharge strategy than in the system of FIG. 5 described below. Thus, a conflict may evolve if vehicle equipment is damaged or if battery life was found to be shorter than expected.

Second Embodiment

Referring to FIG. 5, an alternative embodiment of a contactless recharging system 100 of the present invention is shown. In the alternate charging system 100, an alternate primary convertor 102 receives power from the power source 16 via conductors 18. While the conductors 18 are illustrated for a three-phase AC power source, it is apparent that DC or other polyphase AC power may also serve as a suitable power source 16. The primary convertor 102 receives and converts power from source 16 into high frequency AC power as described further below, and provides a high frequency output power to a conductor loop 104. The operation of the various components of the recharging system 100, such as primary converter 102, is discussed further below after an overview of the operational interrelationship between the various components.

Vehicle 106 has an energy storage device as described above for vehicle 14, and referred to for simplicity herein as battery 12. However, vehicle 106 differs from vehicle 104 in the manner of control and coupling with the primary converter. Rather than having only a conductor loop 30 mounted on the vehicle (see FIG. 1), vehicle 106 has a tethering conductor or tether 108 which couples coupling means, such as a coupling sheath or link 110 to the vehicle 106. The tether 108 may be as described above for tether 22 of FIG. 1, and the link 110 may be constructed as described above with respect to FIG. 1, with the following differences.

The link 110 has a separable core 112 with separable core portions or segments 114 and 114' which may be pivoted or otherwise joined together as described above with respect to core segments 42 and 42' of FIG. 2. Here, the core segments 114 and 114' are shown pivoted together by a hinge 116.

The link 110 has a core-mounted conductor 120 split into two core portions or segments 122 and 122'. Each of the conductor segments 122 and 122' are carried by core segments 114 and 114', respectively. With link 110 closed, as shown in FIG. 6, there are two minimal air gaps where core segments 114 and 114' abut. Also with link 110 closed, conductor 120 defines an interwinding region 124 within link 110. With the conductor loop 104 located in the interwinding region 124, an interwinding space S' may be defined as between the conductor loop 104 and the core-mounted conductor 120.

Referring to FIG. 6, the method of operating link 110 differs from that of link 25 and 25', in that the coaxial winding transformer (CWT) formed by the coupling of link 110 with conductor loop 104 has power flows different from that of the links 25 and 25' shown in FIGS. 1-3. Specifically, the conductor loop 104 serves as the primary conductor in the power flow system. The core-mounted conductor 120 serves as a secondary conductor, receiving power through induction from the conductor loop 104. While link 110 is shown for the purposes of illustration as being similar in construction to link 25, it is apparent that link 110 may also take on a configuration as shown for FIG. 25'. Furthermore, other geometric forms are also possible for the coaxial winding transformer to transfer power between a core-mounted conductor and a loop conductor.

Figure 7:
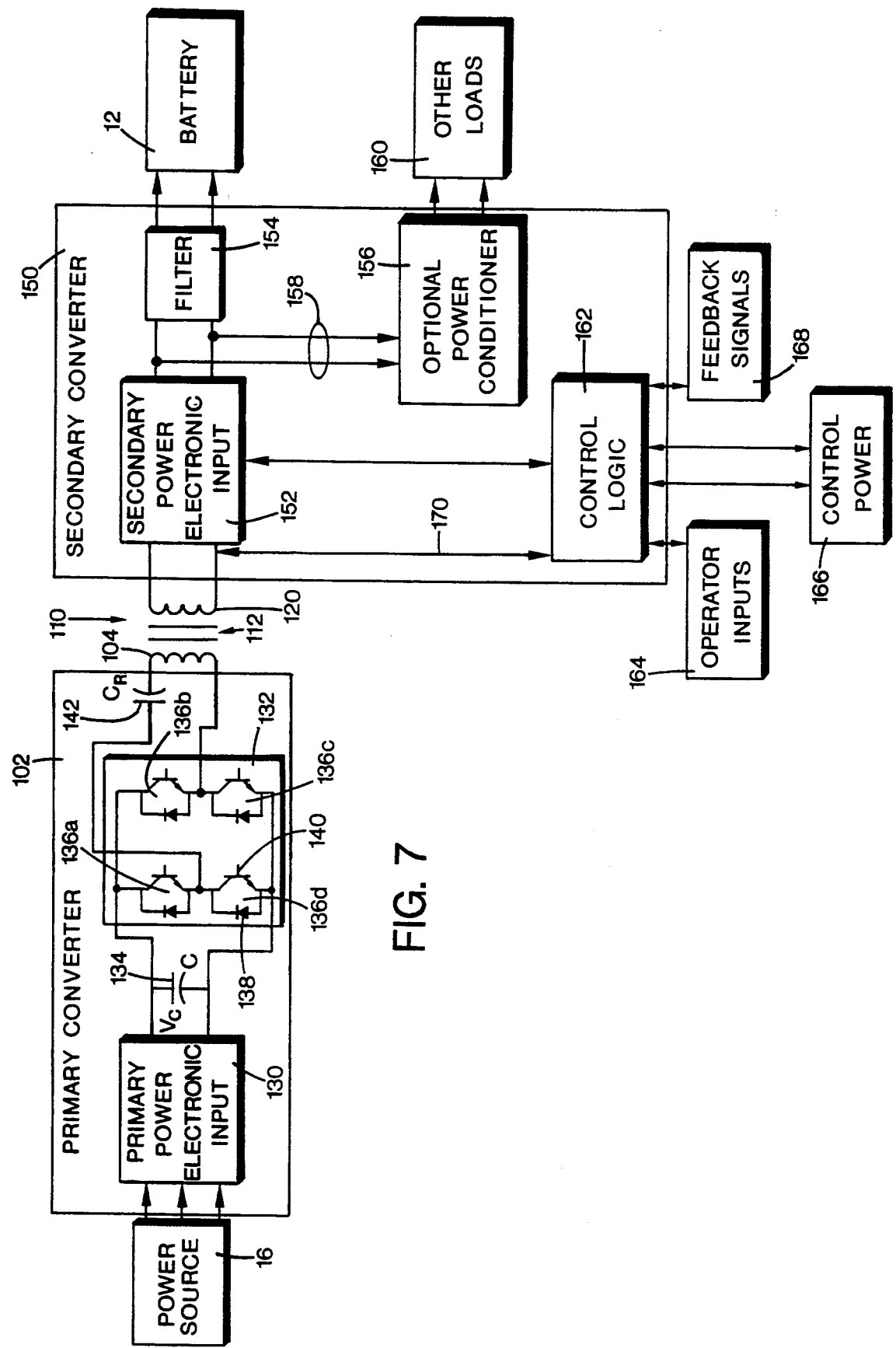
FIG. 7 is a schematic block diagram of one form of the contactless recharging system of FIG. 5.

An illustrated embodiment for the contactless recharging system 100 of FIG. 5 is shown schematically in FIG. 7. Power is received by primary converter 102 from power source 16 which may be as described above with respect to the system of FIG. 1. Power source 16 supplies a primary power electronic input stage 130, which may be as described above for the primary input stage 60 of FIG. 4. If DC power is supplied by source 16, primary input stage 130 may be omitted.

In the illustrated example, primary input stage 130 converts power from source 16 into DC power which is supplied to a high frequency converter, such as a series resonant high frequency converter 132. A capacitor 134 is used to provide a constant DC voltage to inverter 132. In the illustrated embodiment, the high frequency series resonant inverter 132 is shown as having four switched legs 136a, 136b, 136c and 136d. Each inverter leg, such as leg 136d, has a diode 138 coupled across the collector and emitter of a transistor 140. Other power electronic devices may also be used in place of switch 140, such as thyristors or gate turnoff thyristors (GTO's). The high frequency output of inverter 132 is supplied to a resonant capacitor 142.

Resonant converter topology is known in the art, for example, as described in an article by F. C. Schwarz and J. B. Klaassens entitled "Controllable 45 kW Current Source for DC Machines," IEEE Transactions IA, Vol. IA-15, No. 4, July/August, 1979, pp. 437-444. The use of resonant inverter topology advantageously allows the component ratings for the primary and secondary converters to be maintained at an economic level. The resonant capacitor 142 serves to supply the volt-amperes-reactive (VAR) requirements of the conductor loop 104, so the inverter 132 need only supply real power (watts) as needed by the system. The second concern governing the choice of converter topology is that inverter switching at high frequencies are normally limited by the switching losses within the devices. The use of resonant topologies allows device switching at near zero voltage or near zero current crossing points, which results in significantly lower switching losses and the ability to obtain higher frequencies.

Thus, the output of primary converter 102 is supplied to conductor loop 104 and by induction to the core-mounted conductor 120 of link 110 (each of which are shown schematically in FIG. 7). Referring also to FIG. 5, power received by link 110 is delivered via a conductor within tether 108 to a secondary converter 150 mounted on-board vehicle 106. The converter 150 has a secondary power electronic input stage 152 which receives power from the core-mounted conductor 120 and rectifies it into charging power supplied to filter 154. The secondary input stage 152 and filter 154 may be as described above for secondary input stage 80 and filter 82, respectfully, as discussed with respect to FIG. 4. The filtered rectified charging power is then supplied by secondary converter 150 to battery 12 for recharging.

The secondary converter 150 may be modified as known in the art to provide other types of charging power to the energy storage device. If desired, the secondary charging current can be conditioned with a frequency change, voltage change, or phase change. For example, the secondary power electronic input stage 152 may be a bridge rectifier for DC output, and AC/DC controlled converter for variable DC output, or an AC/AC cycloconverter for variable AC output. Such an implementation, with at least some control on both sides of link 110 is a preferred embodiment, as well as for a DC charging current embodiment.

The secondary converter 150 may also include an optional power conditioner 156, tapping a portion of the DC power rectified by the secondary input stage 152 via conductors 158. In some applications, it may be advantageous for power conditioner 156 to receive high frequency power directly from conductor 120, prior to processing by the secondary input stage 152. The power conditioner 156 provides power to other loads 160, which may be as described above for the other loads 88 of FIG. 4.

The secondary converter 150 includes a control logic unit 162, which may be of the same type as described for control logic unit 70 of FIG. 4. The control logic unit 162 receives operator inputs 164, control power 166, and a plurality of feedback signals 168, each of which may be as described above for operator input 72, the control power 74, and feedback signals 76, respectively, of FIG. 4.

The control logic unit 162 may communicate with the primary converter 102 via a communication or control signal 170. The communication control signal 170 may operate as described above for control signal 78, with ultra-high frequency communication and control signals, on the order of megahertz. The illustrated kilohertz power transmitted through link 110 serves as the carrier for the communication signal 170.

For example, the primary converter 102 and the power source 16 may be monitored and controlled with the communication signal 170. The communication signal 170 can be an analog modulation signal or a series of discrete digital pulses induced into the loop conductor 104. Monitoring, control and protection signals between the primary converter 102 and vehicle 106 are advantageously achieved without the need for a separate control wire coupling between the primary converter 102 and vehicle 106.

The recharging system 100 having the secondary converter 150, control logic unit 162, and link 110 all mounted on-board vehicle 106 has several advantages. For example, in a method of operation, the operator of vehicle 106 parks the vehicle adjacent the primary converter 102 and manually clamps link 110 around the stationary off-board conductor loop 104. The on-board secondary converter 150 provides power conditioning, recharge strategy logic, circuit protection and safety permissives.

The advantages of system 110 are that more of the control system is mounted on-board the vehicle, and thus the vehicle could have capabilities to adapt to non-standard primary converter power sources at various locations. Furthermore, less initial investment would be required by a power provider to construct a recharge location, that is the primary converter 102 has a more simple topology without the control strategy of the FIG. 1 charging system 10.

Additionally, recharge system 100 would be highly suitable for recharging vehicles during metered parking. The owner of vehicle 106 is in charge of maintenance, and protection of link 110 and tether 108, and they are thus likely to receive better care. Furthermore, the recharge system 100 requires only minimal standardization of infrastructure, and gives the operator of vehicle 106 a maximum choice of energy sources.

However, the recharge system 100 will provide a higher initial cost to the owner of vehicle 106, and provide a more complex on-board system requiring maintenance. Furthermore, the energy supplier in charge of the primary converter 102 is more dependent proper operation of the vehicle owner's equipment to prevent damage to the primary converter 102. The vehicle 106 must carry the additional weight and provide the additional space for the control logic, tether 108 and link 110. Additionally, the expensive control and converter equipment works under a lower load factor than the recharging system 10 of FIG. 1, that is, the expensive hardware of system 100 is used less per day than the converter equipment of FIG. 1.

Third Embodiment

FIG. 8 illustrates an automatic contactless recharging system 200 which may operate as illustrated schematically in FIG. 4, and may have a link 25 or 25' as shown in FIGS. 2 or 3. The recharge system 200 has a primary converter 202 receiving power from the power source 16 via conductors 18, as described above for FIG. 1. The electric vehicle 14 of FIG. 8 may be identical to vehicle 14 in FIG. 1, having a power pickup conductor loop 30 coupled with a secondary converter 32. The secondary converter 32 provides the required charging power to the energy storage device as described above for the FIG. 1 embodiment, and is shown as a battery 12 only for simplicity herein.

The primary converter 202 may be as described above for converter 20, but preferably also includes several additional control features. Rather than the tether 22 and manually coupled link 25 of FIG. 1, the automatic recharging system 200 has a robotic-type positionable arm 204, which may be actuator operated. The arm 204 extends outwardly from primary converter 202 to support automatic coupling means, such as a coupling sheath or link 205. If the link 205 has a separable core, such as core 40 of FIG. 2, the robotic arm 204 may be a reach and grasp type arm which opens the link 205 to receive conductor loop 30 and then closes the link around the vehicle-mounted conductor 30. If link 205 is similar to link 25' shown in FIG. 3, the robotic arm maintains position of core segment 52 and conductor 55 with respect to core segment 54 to provide a minimal air gap between the core segments 52, 54.

The method of operation of the automatic link 205 is similar to that of the manual coupling link 25, in that it is also configured to grasp and surround the pickup loop conductor 30 mounted on vehicle 14. Flux and position sensors, such as Hall effect and optical position sensors, respectively, (not shown) may be mounted on the arm 204 or link 205, or on the housing for converter 202. The position sensors are used in controlling the extension of arm 204 and link 205 into a grasping engagement with the pickup loop 30. The converter 202 may include control logic to receive signals from the position sensors and use these position sensor signals in moving arm 204 and link 205 into a charging position, and after charging, to retract to a neutral, starting or "at rest" position. Additionally, flux and position sensors can be mounted to the link and/or to the vehicle 16 to allow feedback of the arm position relative to conductor loop 30 for automatic positioning of the arm. Such use of sensors and positioning of the arm 204 in response thereto are well known in the robotic arm art.

In a method of operating the automatic recharging system 200 of FIG. 8, an operator of vehicle 14 parking the vehicle within a bounded area 208 adjacent primary converter 202. The vehicle may be positioned by a variety of means, such as with light indicators, limit switches, or simple recesses 210 in the pavement 212 adjacent converter 202. Upon actuation, the automatic system 100 automatically makes a contactless clamp-on coupling of link 205 with the vehicle-mounted conductor loop 30. The automatic system 200 allows for scheduling of recharge time and strategy, and provides automatic recharge, monitors and records results, then disconnects and provides an indication of completion to a driver of vehicle 14.

The advantages of the automatic recharging system 200 include the use of an positioning controller, as is well known in the art of robotic arms, in which maximum safety may be programmed. The automatic system 200 is also well suited to fleet operations where the vehicle parking pattern and operator use are consistent. That is, fleet vehicles are typically in the care of a single driver, and are required to be parked in designated areas, rendering automatic recharge a very attractive option for fleet use.

Furthermore, the automatic system 200 provides a maximum ability, compared to the other systems discussed herein, to provide high usage rates, to minimize on-going labor, and the ability to provide load leveling or automatic scheduling of power delivery as a part of an energy management system to reduce peak power demand, that is, to recharge during the non-peak load hours of the utility. Furthermore, the system 200 is well suited to automatic diagnostics, trend monitoring, and automatic record keeping systems.

Finally, there is minimal user involvement required with the automatic system 200, other than parking the vehicle in the designated location adjacent the primary converter 202. However, the automatic system 200 is the most complex of the three proposed here. The automatic system 200 has a higher initial cost and may be sensitive to user abuse. Additionally, system 200 is highly dependent upon standardized vehicle dimensions and standardization of the converter circuit 32 on-board the vehicle. Additionally, system 200 is less likely to be implemented for recharging at various distributive sites.

Fourth Embodiment

Figure 9:
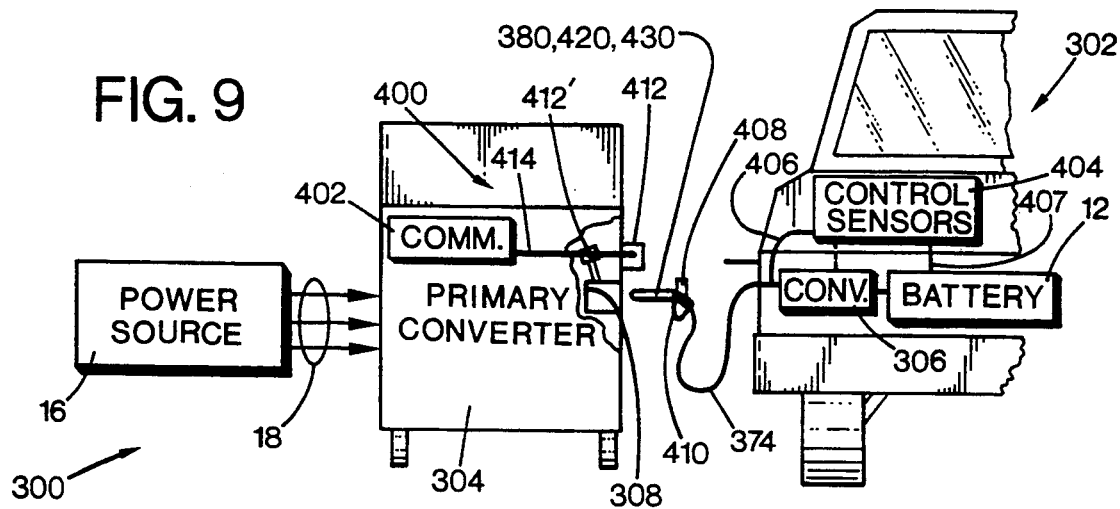
FIG. 9 is a partially schematic and partially cutaway rear elevational view of an additional alternate form of a contactless recharging system of the present invention.

Referring to FIG. 9, another embodiment of a contactless recharging system 300 constructed in accordance with the present invention is shown for supplying charging power for recharging an energy storage device, such as battery 12 onboard an electric vehicle 302. The recharging system 300 has a primary converter 304 for receiving power from power source 16 via conductors 18. The battery 12 onboard vehicle 302 is coupled to a secondary converter 306. The primary and secondary converters 304 and 306 may be as described above for primary converter 20 and secondary converter 32, respectively, as shown in FIG. 4. Alternatively, the converters 304 and 306 may be as described as above for the primary converter 102 and secondary converter 150, respectively, as shown in FIG. 7.

Figure 10:
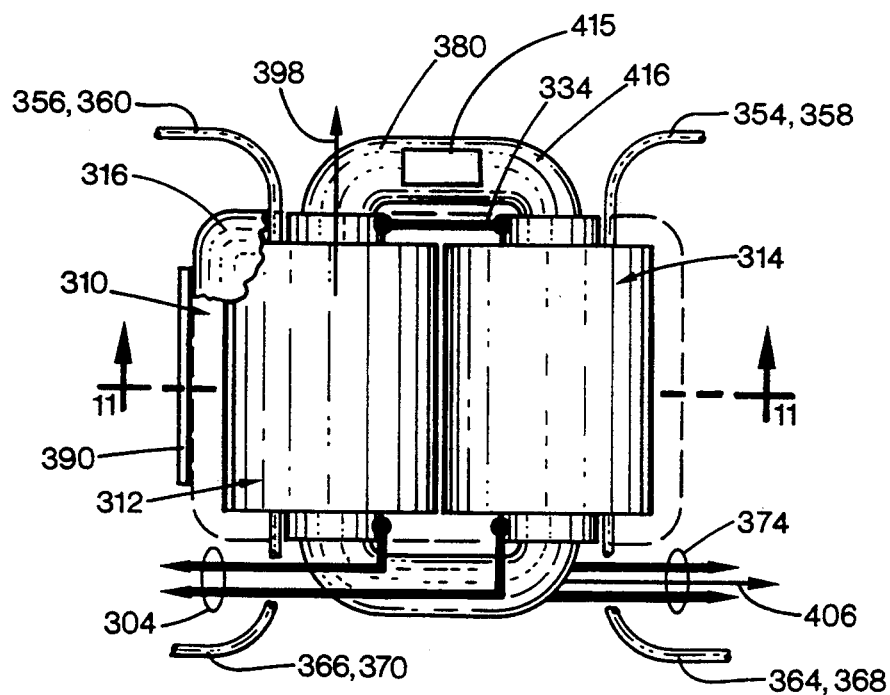
FIG. 10 is a partially schematic top plan view of one form of a separable coupling link surrounding one form of a conductor loop of FIG. 9.
Figure 11:
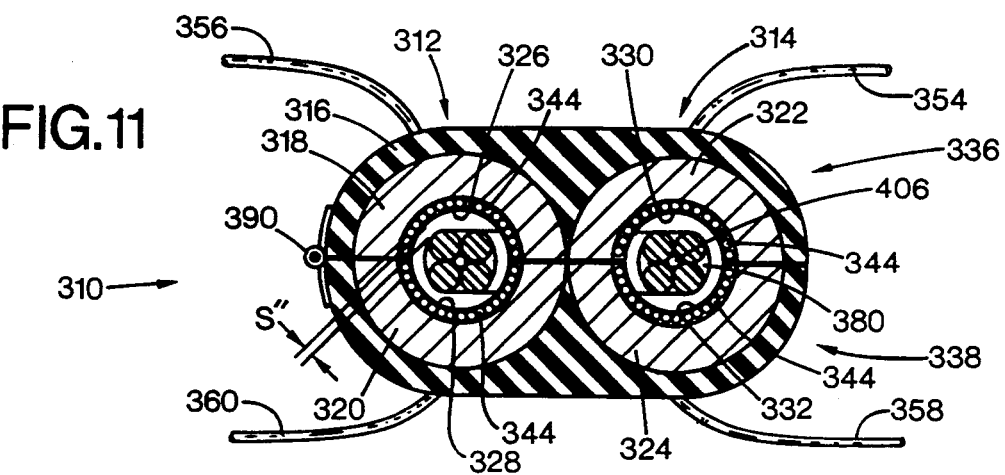
FIG. 11 is a cross-sectional front elevation view taken along lines 11—11 of FIG. 10.
Figure 12:
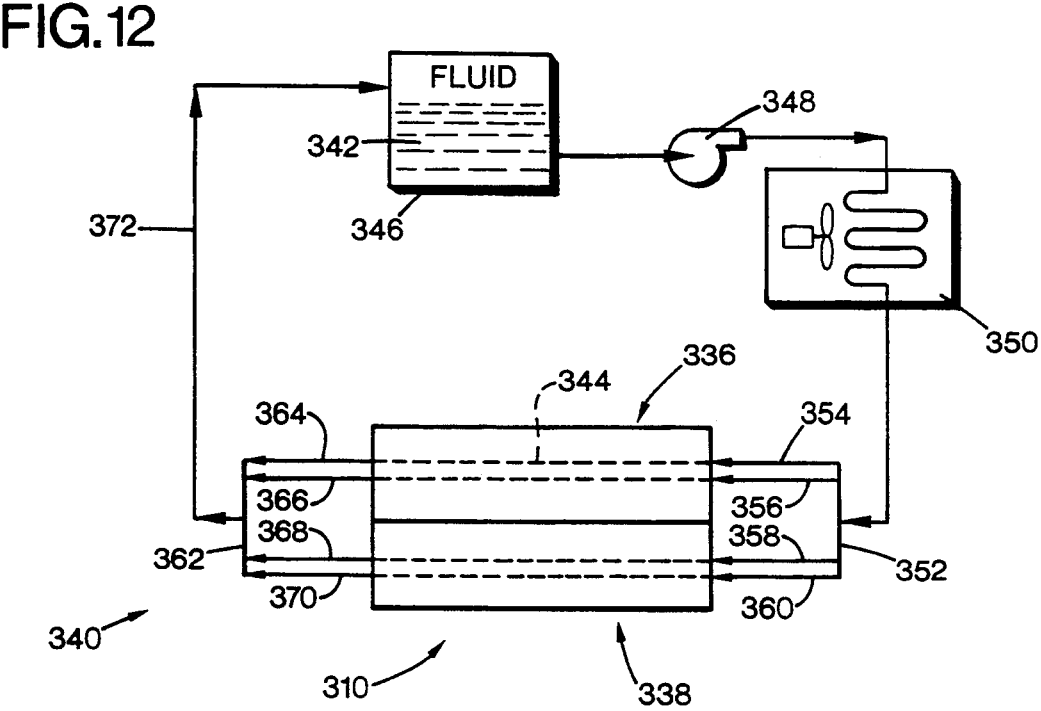
FIG. 12 is a schematic diagram of a fluid cooling system for use with the link of FIG. 10.

Preferably, the primary converter 304 includes a recessed portion 308 for receiving a coupling link, such as an alternate embodiment of a coupling sheath or link 310 constructed in accordance with the present invention as shown in FIGS. 10–12. The coupling link 310 may be installed for protection within the recessed portion 308 of primary converter 304. The link 310 is illustrated as a dual coupling link having two link members 312 and 314. The link 310 is preferably surrounded by a protective jacket or shell 316 of a durable, insulative material, such as a plastic, rubber or other elastomer.

The core segments 318, 320, 322 and 324 may be of a ferrite core material, such as a PC-40 type ferrite cores. Preferably, the gap at the core separation is minimized. For example, design studies and experimentation show an effective gap of 0.1 mm (millimeter) is achievable, and gaps of more than about two millimeters lead to an unsatisfactory degraded performance.

The dual link 310 also has a core-mounted primary conductor comprising two portions, one located in each link member 312 and 314. The link member 312 has a segmented primary conductor portion illustrated as being split into two core-mounted conductor segments 326 and 328. The link member 314 has a segmented primary conductor portion illustrated as being split into two core-mounted conductor segments 330 and 332. The primary conductor segments 326, 328, 330 and 332 are electrically coupled together, as schematically illustrated by conductor 334 in FIG. 10. As illustrated, the segmented link 310 has an upper first portion 336 mating with a lower second portion 338. The upper link portion 336 comprises core segments 318, 322 and primary conductor segments 326, 330, whereas the lower link portion 338 comprises core segments 320, 324 and primary conductor segments 328, 332.

Alternatively, the upper and lower link portions 336 and 338 may be formed into continuous U-shaped portions (not shown), rather than the dual link configurations shown in FIGS. 10–11. For example, the conductor segments 326 and 330 may be leg portions of a single U-shaped upper conductor segment (not shown), with conductor segments 328 and 332 similarly joined together as a single U-shaped lower conductor segment (not shown). Using a U-shaped primary conductor reduces end winding leakage losses and eliminates the need for the separate conductor 334. Further leakage inductance reduction may be achieved by forming U-shaped upper and lower core segments (not shown) to substantially surround such respective U-shaped upper and lower primary conductor segments. For link frequencies in the 20 kHz range, press sintered core material is preferred and may advantageously be formed into various shapes, such as a U-shaped core, which may require subsequent finishing to form a channel therein to receive the primary conductor.

As shown in FIG. 11, the link member 312 has a segmented core illustrated as being split into two core segments 318 and 320. Similarly, link member 314 has segmented core illustrated as being split into two core segments 322 and 324. While the cores of link members 312 and 314 are illustrated as being cylindrical in shape, it is apparent to those skilled in the art that core segments 318, 320, 322 and 324 may have cross sectional configurations other than the illustrated semi-circular configurations, such as rectangular or square shapes as illustrated in FIG. 3 above.

Referring also to FIG. 12, optionally, the primary converter 304 may include a fluid cooling system 340 for circulating a cooling fluid, such as a gas or a liquid, for instance, water 342, through the link 310. The link 310 has a cooling fluid chamber defining a passageway which may be divided into a plurality of passageways indicated by the tubular conduits, such as conduits 344 in FIG. 11. Preferably, the plural fluid carrying conduits are of a non-magnetic electrically insulative material, such as a plastic, located between the core and the core-mounted conductor, such as between core segment 318 and primary conductor segment 326, as illustrated in FIG. 11. Alternatively, the fluid chamber may be located within the core-mounted conductor, for instance with each of the conduits 344 being of a copper material which also serves as the core-mounted primary conductor.

As shown in FIG. 12, the illustrated fluid cooling system 340 has a reservoir 346 in communication with a pump or compressor unit 348 which supplies the fluid from reservoir 346 to a heat dissipation device, such as an air-cooled heat exchanger 350. The cooled fluid flows from the heat exchanger 350 to a supply manifold 352. The supply manifold 352 is illustrated as splitting into four inlet conduits 354, 356, 358 and 360 to feed the fluid 342 to conduits 344 located adjacent primary conductor segments 330, 326, 332 and 328, respectively. The fluid flows through conduits 344 of link 310 to a discharge manifold 362. The discharge manifold 362 is illustrated as joining four outlet conduits 364, 366, 368 and 370 receiving the fluid 342 from conduits 344 located adjacent primary conductor segments 330, 326, 332 and 328, respectively. The cooling system 340 has a return conduit 372 which returns fluid 342 from the discharge manifold 362 to the reservoir 346. It is apparent that the fluid cooling system 340 may be constructed in a variety of different structurally equivalent forms as known to those skilled in the art.

Referring again to FIGS. 9–11, preferably, a flexible tethering conductor 374 couples a contactless secondary conductor loop 380 to the secondary converter 306. The loop 380 is illustrated FIG. 11 as a high-capacity or expedited rate charging loop having four parallel conductors 382, 384, 386 and 388, as shown FIG. 13.

Figure 13:
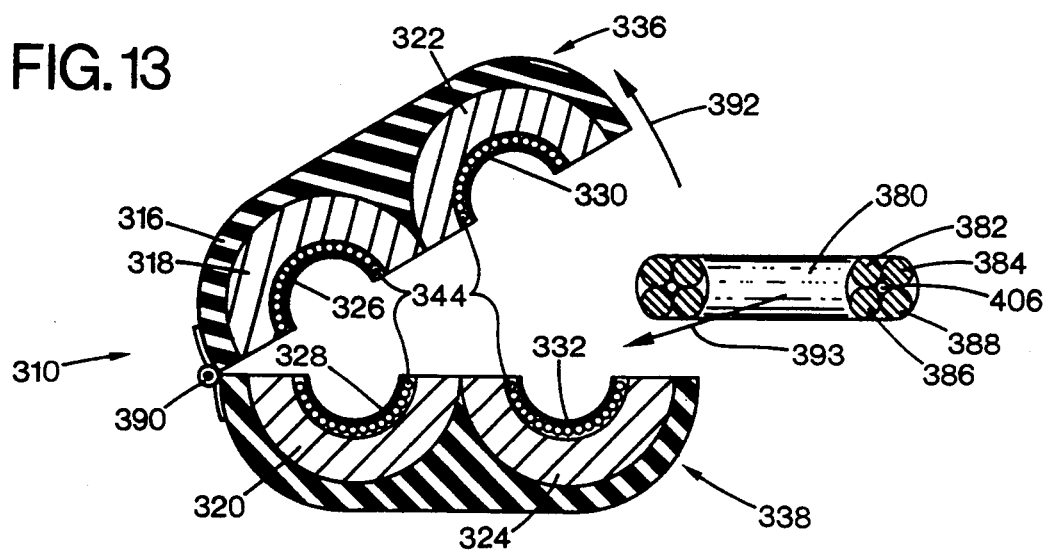
FIG. 13 is a cross-sectional front elevation view of the link shown open for receiving the loop of FIG. 10.
Figure 14:
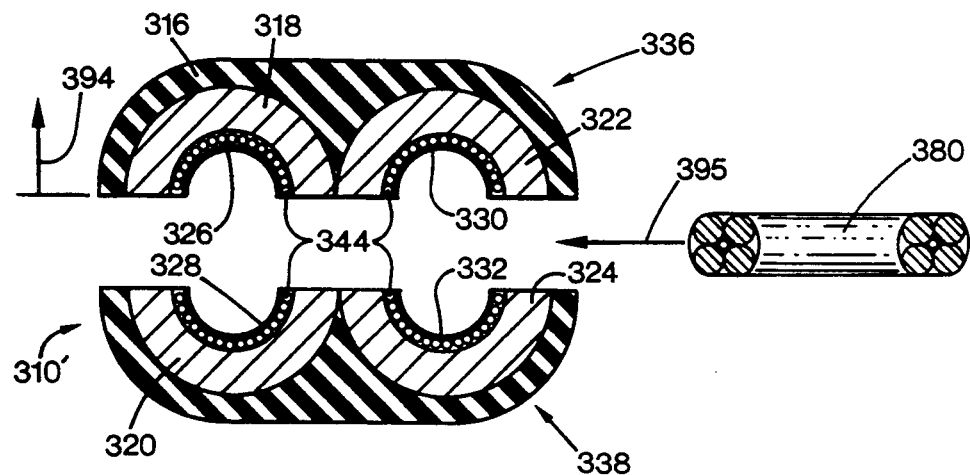
FIG. 14 is a front elevation view of one form of an alternate embodiment of a coupling link of the present invention shown open for receiving the loop of FIG. 10.
Figure 15:
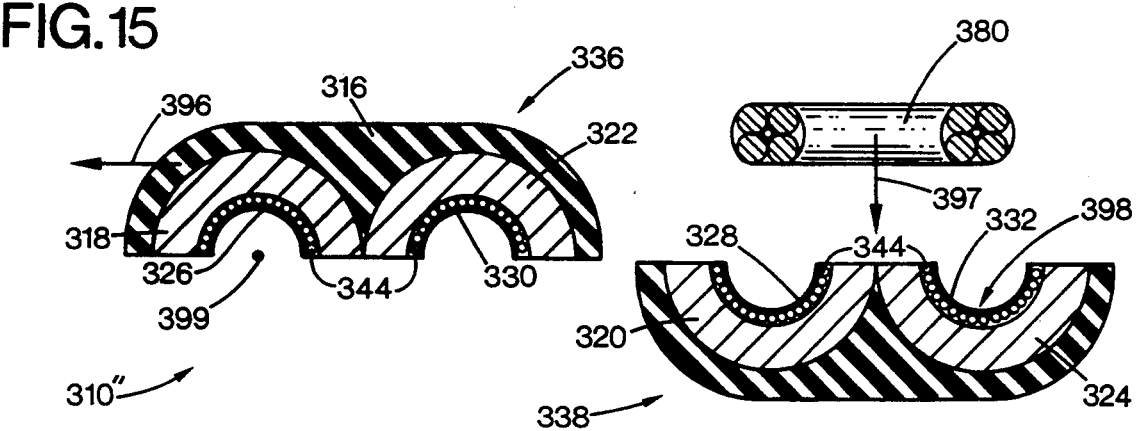
FIG. 15 is a front elevation view of one form of another alternate embodiment of a coupling link of the present invention shown open for receiving the loop of FIG. 10.

Referring to FIGS. 13–15, three alternate embodiments for separating and joining together the link segments are illustrated. The link portions 336 and 338 are separable to open and receive loop 380 therebetween. The link portions 336, 338 are then closed together for charging battery 12, and opened when charging is complete.

FIG. 13 shows the link 310 has a clam-shell-type opening, where the two link portions 336 and 338 are pivotally joined together by a hinge 390. Preferably, the upper portion 336 is pivotally opened away from the lower portion 338 as indicated by arrow 392, allowing the loop 380 to be inserted therebetween, as indicated by arrow 393, then pivotally closed to transfer power therebetween.

Referring to FIG. 14, an alternate link 310' is shown equipped for a radial opening by radially separating portions 336 and 338 in the direction indicated by arrow 394. The radial opening of link 310' allows loop 380 to be inserted between the open link portions 336 and 338, as indicated by arrow 395.

Figure 16:
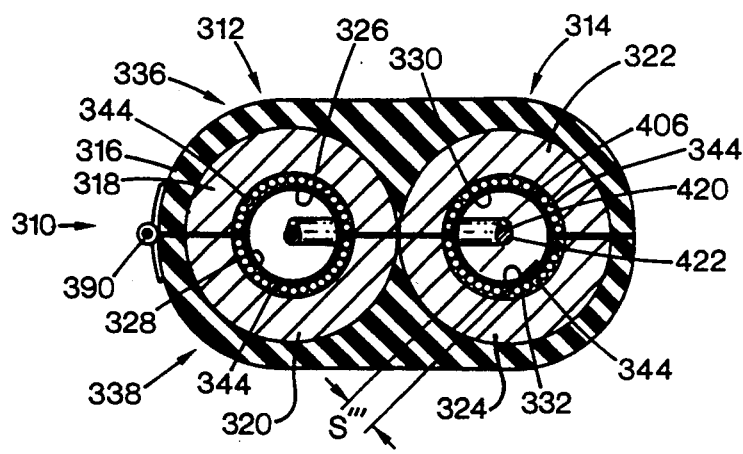
FIGS. 16 and 17 are front elevation views of the link of FIG. 10 shown surrounding two alternate forms of conductor loops of the present invention.

FIG. 16 illustrates another alternate link 310" equipped for a translational opening by sliding segment 336 apart from segment 338, as illustrated by arrow 396. The translational opening of link 310" allows loop 380 to be inserted therein, as indicated by arrow 397. The link 310" is closed by moving link portion 336 in a direction opposite arrow 382, as long as adequate clearance exists so portion 336 clears loop 380. Such clearance may be provided by constructing nonsymmetrical link portions (not shown) having the stationary portion formed with a deeper loop receiving contour 398, or by moving link portion 336 in an upward direction perpendicular to horizontal arrow 396 as illustrated in FIG. 15. Alternatively, the link portion 336 may be moved translationally in an axial direction substantially parallel with a longitudinal axis 399 of the link 310", illustrated in end view as a point 399 in FIG. 15. Other structurally equivalent variations and combinations of the radial and translational link opening mechanisms of FIGS. 14 and 15, as well as the pivotal opening of FIG. 13, may be implemented by cams, links, levers, and servomechanisms (not shown) as known by those skilled in the art.

Referring again to FIG. 9, the contactless recharging system 300 preferably has a communication system 400, which in the illustrated embodiment includes the primary converter station 304 having communication ("COMM.") control equipment 402. The communication equipment 402 interacts with the control logic of the primary converter 304, such as logic unit 70 of FIG. 4, or alternatively with logic unit 162 of the secondary converter 150 of FIG. 7 via signal 170.

The control equipment 402 may receive an input from a charging rate indicator for indicating a selected charging rate for battery 12. The converter 304 responds to the charging rate indicator by converting power from source 16 into AC power supplied to link 310 at the selected charging rate. The charging rate indicator may be implemented in a variety of different manners. In one embodiment, the selected charging rate may be an operator input, supplied to the primary converter 304 by an operator, for instance, from a keypad (not shown) located at, or remote from, the converter 304. Alternatively, as mentioned above, a charging rate indicator signal may be superimposed in ultra-high frequency megahertz signals over the high frequency kilohertz power delivered via conductors 382, 384, 386 and 388 of loop 380.

In the embodiment of FIG. 9, an interactive communication system 400 is illustrated. The electric vehicle 302 may have a control sensor array 404 for generating a charging rate indicator signal. The on-board control sensor array 404 may comprise a portion of the secondary converter 306 (not shown), or be coupled thereto as indicated by the dashed line in FIG. 9. The sensor array 404 may monitor the battery for charging status, rate, failed cells, and the like, as schematically indicated by sensor signal 405.

The charging rate indicator signal is carried by a communication conductor 406 from sensor array 404. In the illustrated embodiment of FIG. 9, the communication conductor 406 extends through, or adjacent to, the tether 374 and is coupled to an indicator interface device 408 mounted on a handle 410 of the loop 380. The indicator device 408 may be aligned to communicate with a communication interface device 412 when the loop 380 is coupled with link 310. The communication interface device 412 is supported by the converter 340 adjacent recess 308, and is coupled to the primary converter communication equipment 402 by conductor 414.

In the optional embodiment of FIGS. 10 and 11, the loop 380 may carry an indicator interface device 415 mounted an exterior surface 416 of loop 380 for indicating the selected charging rate for battery 12. In this illustrated embodiment, the communication conductor 406 extends through the tether 374 and the loop 380 to couple with the indicator 415. With the indicator 415 located on loop 380, the communication interface device is positioned at an alternate location, indicated as device 412', inside recess 308 to communicate with indicator 415 when loop 380 is coupled with link 310.

One preferred embodiment uses a fiber optic transmitter for the indicator interface devices 408, 415, and a fiber optic receiver for the communication interface devices 412, 412', as illustrated in FIGS. 9 and 10. Other structurally equivalent converter communication and indicator interface devices may be substituted as known by those skilled in the art for the illustrated fiber optic devices, such as metal-to-metal contacting interface devices, optical readers, and electromagnetic or inductive interface devices (not shown). The indicator signal generated by the on-board sensor array 404 may communicate other information from the vehicle 302 to the primary converter 304, such as charge status; battery conditions, for instance, a shorted battery cell; vehicle identification; charge account authorization; and the like.

The contactless recharging system 300 is readily adaptable for charging a variety of electrical vehicles having different charging rates, or for charging a single vehicle at two or more different charging rates, such as a normal rate and an expedited rate. For example, the loop 380 may be sized for expedient fast charging of battery 12, with a rating, for example, on the order of 120 kilowatts. FIG. 16 illustrates an alternate coupling loop 420 coupled to the onboard secondary converter 306 by the flexible conductive tether 374. The loop 420 has a smaller capacity than loop 380 indicated by the smaller cross sectional area of loop 420 compared to loop 380. The loop 420 may also be constructed of one or more parallel loops or turns, as illustrated for the secondary loop 380, but for simplicity has been illustrated as having a single power conductor 422. The loop 420 is illustrated as carrying a communication loop conductor 406 as described above. The interwinding space S" in FIG. 11 for the high capacity loop 380 is far less than the interwinding space S"' shown for conductor loop 420 in FIG. 16.

Figure 17:
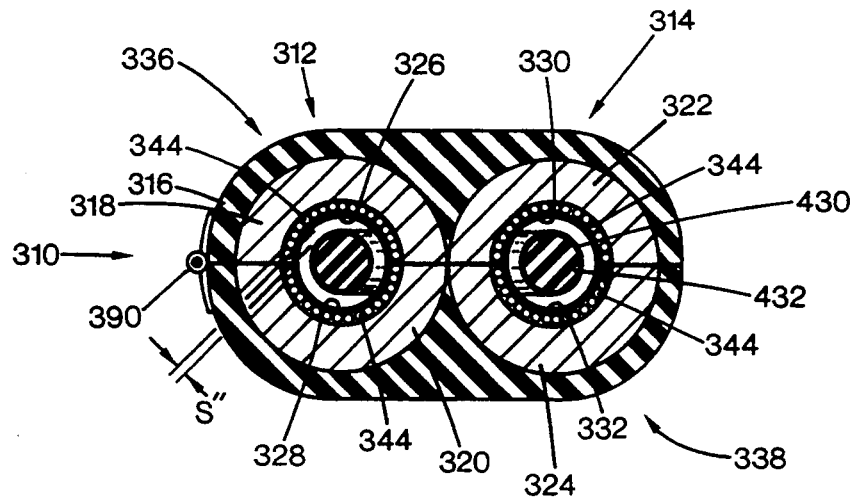

Referring to FIG. 17, an alternate thin-walled tubular conductor loop 430 is shown as a substitute for the single-turn loop 420 illustrated in FIG. 16. The tubular loop 430 fills a greater volume within link 310 than loop 420, and places the conductor material of loop 430 closer to the core-mounted primary conductor. For instance, the outer cross sectional diameter of the loop 430 may be sized to yield an interwinding space S" of the same dimension as shown for loop 380 in FIG. 11.

The smaller interwinding space S" achieved with loop 430 advantageously lowers the leakage inductance compared with that encountered using a loop 420 having a single turn. The leakage inductance per axial meter of core length (parallel with longitudinal axis 399) may be determined in a fashion similar to that used for a coaxial transmission line. For instance, when the outer primary conductor is approximated by an infinitely thin current sheet:

$$L = [(N^2 \mu_0) \div (8\pi)][1 + 4 \ln (K)] H/m \tag{1}$$

$$K = (R1 \div R2) \geq 1 \tag{2}$$

where:
N = turns ratio of the number of secondary turns to the number of primary turns;
R1 = distributed primary current sheet radius;

R2=the secondary conductor outer radius; and
$\mu_0$=permeability of free space ($4\pi \times 10^{-7}$ H/m).

It is apparent that by making the ratio K close to one, for example, by increasing the R2 secondary conductor outer radius, advantageously decreases the leakage inductance L.

As illustrated in FIG. 17, the interior of the loop 430 may be packed with a filler 432 of an insulative, non-magnetic material. Alternatively, the interior of the loop 430 may be hollow and air-filled or evacuated. In another alternative embodiment, the interior of loop 430 may be filled with an insulative, non-magnetic cooling medium (not shown). While not shown, if used, the optional communication conductor 406 may travel in parallel along the exterior or interior of the tubular loop 430.

The vehicle 302 may be equipped with both types of conductor loops, with loop 420 or 430 for normal charging and loop 380 for expedited charging. The loops 380 and 420 (or 430) may both be permanently coupled to the secondary converter 306. Preferably, the loops are interchangeable, so only a single loop 380 or 420 (or 430) is coupled to converter 306 at a given time. For example, for extended road trips, the expedited charging loop 380 is installed for fast charges during driving breaks along interstate highways and the like. For daily commuting, the normal loop 420 or 430 is used, allowing the heavier fast charging loop 380 to be stored in the vehicle owner's garage, for instance, to reduce on-board weight for increased efficiency.

Alternatively, the vehicle 302 may be equipped only with the higher capacity expedited rate loop 380, with the charging rate indicator 408, 415, or an operator input (not shown) communicating a selected charging rate, normal or expedited, to the primary converter 304. The current state of battery technology favors normally charging at a lower rate to extend battery life, and the economics of consumer usage favors charging at a lower rate at home whenever possible.

As a practical example, a typical contactless charging system 300 in the United States may be configured to receive AC power from power source 16 at 230 $V_{AC}$, single phase, with a 30 Amp capacity. Assuming standard losses in the primary and secondary converters 304 and 306 indicates that an overall efficiency of 95% is feasible. For a typical electric vehicle 302 with 20 kilowatt-hours of energy storage capacity, a charging time of three to six hours is expected, depending upon any trickle charge requirements and the specific type of battery 12 selected. For remote or emergency applications, a lower rated emergency charger for operation from a single phase 115 $V_{AC}$ power source 16 has a 1.3 kW (kilowatt) rating.

To efficiently replace today's fleet of internal combustion engine vehicles, the electric vehicles 302 are capable of accepting a fast, high power charge at a road side service station during a long distance trip. For example, a 15 minute charging period may require charging rates of 50 kW to 370 kW, depending upon the size of vehicle 302. These illustrated ratings are expected to grow as battery energy storage capacity increases with improvements in battery technology. Preferably, electric vehicles 302 having high power charge capacity are also able to connect to a home based 230 $V_{AC}$ and emergency 115 $V_{AC}$ primary converting stations 302 without requiring additional hardware. The system 300 operates over such a wide power range, while minimizing the weight and cost of on-board and residential charger components.

The use of the coaxial winding transformer comprising link 310 and loop 380, for instance, allows an unprecedented degree of scalability by allowing design over a wide power range, as well as control over otherwise dominant parasitics, such as transformer leakage flux. By placing all the transformer core material off-board in the charging station 304, the on-board transformer component is limited to a simple wire loop 380 sized for the highest current level. The loop 380 has no magnetic material, and hence minimal sensitivity to operating frequency or to flux density, allowing the system 300 to operate over a wide frequency range, with a variety of converter topologies and core materials. Since the on-board secondary conductor comprises a simple wire loop 380, the loop 380 may be over-sized with a very small cost or weight penalty for the vehicle user.

For lower power applications, a smaller, lower rated loop 420 may be used, and may be made to fit within the geometrical constraints of the larger loop 380 without substantial cost penalty. By comparing FIGS. 11 and 16, it is apparent that the inner diameter of the primary conductor segments of link members 312 and 314 may be the same, as well as the center-to-center span between link members 312 and 314, to advantageously provide charging scalability using a single link 310. These dimensions may be used to describe a universal loop geometry interface, as illustrated by loops 320 and 420. Thus, the system 300 efficiently handles this wide power range without significant penalties on the components designed for lower power levels.

Table 1 below shows calculated data for a 6.6 kW system, such as for loop 420 of FIG. 16, optimized for operation at 77 kHz, as well as computer calculated data for a 6.6 kW (FIG. 16) and a 120 kW implementation (FIGS. 10–11). Any overall penalty in terms of size and efficiency (and possibly cost) of system 300 is minimal for the 6.6 kW design, especially as viewed by a user of the electric vehicle 302. One 6.6 kW system has been built without the optional water cooling system 400, and tested in the laboratory with satisfactory.

TABLE 1

| Coaxial Winding Transformer Design Data | | | |
|---|---|---|---|
| | Optimized for 6.6 kW only | Universal Design | |
| Ratings: | | | |
| Power | 6.6 kW | 6.6 kW | 120 kW |
| Primary Voltage | 200 V | 200 V | 200 V |
| Primary Current | 57 Amp | 58 Amp | 600 Amp |
| Secondary Voltage | 400 V | 400 V | 400 V |
| Secondary Current | 25 Amp | 25 Amp | 300 Amp |
| Frequency | 77 kHz | 77 kHz | 20 kHz |
| Bm (PC-40 Ferrite) | 210 mT | 210 mT | 210 mT |
| Transformer Dimensions: | | | |
| Core Length total | 260.0 mm | 260.0 mm | 260.0 mm |
| Inner Conductor OD × 4 | 3.4 mm | 3.4 mm | 15.0 mm |
| Outer Conductor ID | 11.2 mm | 46.4 mm | 46.4 mm |
| Outer Conductor OD | 11.6 mm | 46.9 mm | 47.4 mm |
| Core ID | 12.2 mm | 47.4 mm | 58.0 mm |
| Core OD | 23.8 mm | 59.2 mm | 102.8 mm |
| Total Effective Air Gap | 0.5 mm | 0.5 mm | 0.5 mm |
| Transformer Weight: | | | |
| Core Weight | 0.414 kg | 1.225 kg | 7.07 kg |

TABLE 1-continued

Coaxial Winding Transformer Design Data

|  | Optimized for 6.6 kW only | | Universal Design |
|---|---|---|---|
| (PC-40) Primary Copper Weight | 0.055 kg | 0.389 kg | 0.77 kg |
| Secondary Copper Weight | 0.038 kg | 0.066 kg | 0.67 kg |
| Total Weight | 0.507 kg | 1.680 kg | 8.51 kg |
| Power Density (kW/kg) | 19.98 | 6.0 | 14.1 |
| Efficiency | 99.58% | 99.01% | 99.70% |

Conclusion

As discussed above, each system has its features and drawbacks. System 10 of FIG. 1 aesthetically resembles a gasoline service station configuration. The recharging system 100 of FIG. 5 resembles a conventional consumer electric appliance having a cord plugging into a power receptacle. Thus, conceptually, recharging systems 10 and 100 would likely be well received by the consuming public, depending upon whether they consider an electric vehicle to be similar to a gasoline powered car, or an electric appliance. The automatic system 200 of FIG. 8 has appeal in that no user contact with the coupling is required to initiate charging, other than proper parking of the vehicle 14 adjacent the primary converter 42. However, the robotic arm is more complex and costly to implement than the systems of FIGS. 1 and 5.

The system 300 is preferred for its scalability, allowing charging of vehicles having different charging capacities from a single charging station 304, as well as allowing for selecting different charging rates for a single vehicle 302, such as normal and expedited charging rates. For example, the loop 380 of FIG. 11 may be rated for charging at 120 kW, whereas the loop 420 may be rated for charging at 6.6 kW. The recharging system 300 also illustrates a fluid cooling system 400 which may be used for the coupling links 25, 25' and 110 by adding cooling conduits (not shown) as described for conduits 344 of link 310. Fluid cooling of the link advantageously dissipates heat generated by $I^2R$ losses, allowing for faster charging with lower initial core-mounted conductor costs.

Thus, the contactless battery recharging system described herein is suitable for high frequency operation, on the order of 2–50 kHz, with a very high power density of the CWT link conductors and converters operating with a very fast response time. Additionally, the power connection between the primary converter and vehicle requires no exposed conductors at any time. Additionally, the recharging circuit is insensitive of the position of the core relative to the inner conductor in all directions, that is axially and radially. This insensitivity to the position of the inner conductor with respect to the outer conductor allows for a large interwinding clearance while still maintaining output performance. The coupling link is also force neutral, exhibiting no axial or radial forces between the core-mounted conductor and the conductor loop. These various features render the recharging system described herein to be in a practical sense both physically simple and rugged to compensate for user and environmental physical abuse to the various components of the system.

Recharging systems 10, 100 and 200 supply power to their respective links at a high frequency, such as on the order of 20 kHz for loads of 1–100 kW, and 2 kHz for loads greater than 1 megawatt (1 MW). The primary current provided by the stationary converter induces an equal and opposite amount of ampere-turns in the on-board secondary winding, without any physical contact between the conductors in the CWT. Furthermore, the interwinding space in the CWT may be filled with non-magnetic material for electrical and environmental insulation. Both the primary and secondary circuits of the CWT advantageously have no exposed conductors and no exposed magnetic core material when transferring power. Thus, maximum safety may be achieved in these systems with complete encapsulation of both sides of the CWT, that is, encapsulation of the conductor and core portions mounted to the primary converter and the vehicle-mounted conductor and core portions.

The recharging systems 10, 100, 200 and 300 with the inductively coupled links and loops provide inherent electrical isolation of the source 16 and the battery load 12, so cost penalties over and above providing galvanic isolation are minimal. Other advantages of system 10, 100, 200 and 300 include:

unity power factor and low harmonic currents;
interface suitable for range of vehicles sizes;
interface suitable for range of power levels;
minimum weight loops for consumers to handle;
inherent safety and benign fault modes; and
low cost.

The technology illustrated for the recharging systems described herein is in its infancy. Consequently, any decision made in terms of standardization preferably lends itself well to change occurring due to technology growth. Thus, the components illustrated herein may be substituted by their structural equivalents as known to those skilled in the art as such structural equivalents evolve.

Having illustrated and described the principles of our invention with respect to several preferred embodiments, it should be apparent to those skilled in the art that our invention may be modified in arrangement and detail without departing from such principles. For example, other core configurations may be used for the links described herein, as well as other configurations for the core-mounted conductor, and the substitution of other devices and configurations known to be interchangeable by those skilled in the art. Also, the location of the core may be opposite to the control logic, for instance, the CWT configuration of FIGS. 1-3 may be used with the primary and secondary converters 102 and 150 of FIG. 7. Also, the operator inputs 72 and 174 may be received by either the primary or the secondary converters in FIGS. 4 and 7. Additionally, suitable material substitutions and dimensional variations may be made for the components of the link as described herein. Additionally, the configuration of the primary and secondary converters may vary substantially, depending upon the state of the art of power electronics and other switching devices. We claim all such modifications falling within the scope and spirit of the following claims.

We claim:

1. A contactless charging system for charging batteries on board plural electrical loads each having conductor loop and a secondary converter coupled thereto for converting AC power into DC power to charge the battery at a selected charging rate, the system comprising:

a coupling link having a magnetic core and a core-mounted conductor at least partially surrounded by the magnetic core, the core-mounted conductor contoured for selectively at least partially surrounding a load loop, wherein the link is openable to receive, and closable to substantially surround, said load loop; and a primary converter coupled to the core-mounted conductor for converting power from a power source into the AC power at the selected charging rate corresponding to a load when coupled thereto by the link.

2. A contactless charging system for charging batteries on board plural electrical loads each having a conductor loop and a secondary converter coupled thereto for converting AC power into DC power to charge the battery at a selected charging rate, the system comprising:

a coupling link having a magnetic core and a core-mounted conductor at least partially surrounded by the magnetic core, the core-mounted conductor contoured for selectively at least partially surrounding a load loop, wherein the link is separable into at least two link segments pivotally connected for opening to receive and disengage, and for pivotally closing to engage, said load loop; and a primary converter coupled to the core-mounted conductor for converting power from a power source into the AC power at the selected charging rate corresponding to a load when coupled thereto by the link.

3. A contactless charging system for charging batteries on board plural electrical loads each having a conductor loop and a secondary converter coupled thereto for converting AC power into DC power to charge the battery at a selected charging rate, the system comprising:

a coupling link having a magnetic core and a core-mounted conductor at least partially surrounded by the magnetic core, the core-mounted conductor contoured for selectively at least partially surrounding a load loop having a longitudinal axis, wherein the link is separable into at least two link segments which are radially openable for disengaging, and radially closable for engaging, said load loop in radial directions respectively away from and toward said longitudinal axis of the surrounded portion of said load loop; and a primary converter coupled to the core-mounted conductor for converting power from a power source into the AC power at the selected charging rate corresponding to a load when coupled thereto by the link.

4. A contactless charging system for charging batteries on board plural electrical loads each having a conductor loop and a secondary converter coupled thereto for converting AC power into DC power to charge the battery at a selected charging rate, the system comprising:

a coupling link having a magnetic core and a core-mounted conductor at least partially surrounded by the magnetic core, the core-mounted conductor contoured for selectively at least partially surrounding a load loop having a longitudinal axis, wherein the link is separable into at least two link segments which are translationally openable for disengaging, and translationally closable for engaging, said load loop; and a primary converter coupled to the core-mounted conductor for converting power from a power source into the AC power at the selected charging rate corresponding to a load when coupled thereto by the link.

5. A contactless charging system for charging batteries on board first and second electrical loads, each load having a secondary converter for converting AC power into DC power to charge the battery at a selected charging rate, with the first load having a first load loop sized for charging at a first charging rate, and the second load having a second load loop sized for charging at a second charging rate greater than the first charging rate, the station comprising:

a coupling link having a magnetic core and a core-mounted conductor at least partially surrounded by the magnetic core, the core-mounted conductor contoured for selectively at least partially surrounding each load loop, with the link sized for interchangeably at least partially surrounding each of the first and second loops; and a primary converter coupled to the core-mounted conductor for converting power from a power source into the AC power at the selected charging rate corresponding to a load when coupled thereto by the link.

6. A contactless charging system according to claim 5 wherein the primary converter converts power at the selected charging rate in response to a charging rate indicator for indicating the selected charging rate.

7. A contactless charging system according to claim 5 for charging a load which generates a charging rate indicator signal, wherein the primary converter is responsive to the charging rate indicator signal.

8. A contactless charging system according to claim 5 wherein:

the link includes a chamber defining a passageway for receiving a cooling fluid to cool the core-mounted conductor; and the station further includes a cooling fluid circulation system coupled to the chamber for circulating a cooling fluid through the coupling link passageway.

9. A contactless charging system according to claim 5 wherein the link is openable to receive, and closable to substantially surround, said load loop.

10. A contactless charging system according to claim 5 wherein the link is separable into at least two link segments pivotally connected for opening to receive and disengage, and for pivotally closing, to engage each load loop.

11. A contactless charging system according to claim 5 for coupling to first and second load loops each having a longitudinal axis, wherein the link is separable into at least two link segments which are radially openable for disengaging, and radially closable for engaging, each load loop in radial directions respectively away from and toward the longitudinal axis of the surrounded portion of each load loop.

12. A contactless charging system according to claim 5 wherein the link is separable into at least two link segments which are translationally openable for disengaging, translationally closable for engaging, each load loop.

13. A coupling link, comprising:

a core-mounted conductor for surrounding a portion of a conductor loop coupled to a power source or a load, the core-mounted conductor for coupling to the other of the power source or the load;

a magnetic core at least partially surrounding the core-mounted conductor;

a cooling fluid chamber located within the core-mounted conductor and defining a passageway for circulating a cooling fluid through the link; and a shell of an insulative material encasing the core and the core-mounted conductor, the shell defining a loop receiving portion for receiving the loop therein.

14. A coupling link according to claim 13 wherein the cooling fluid chamber comprises plural fluid carrying conduits located between the core and the core-mounted conductor.

15. A coupling link, comprising:

a core-mounted conductor for surrounding a portion of a conductor loop coupled to a power source or a load, the core-mounted conductor for coupling to the other of the power source or the load;

a magnetic core at least partially surrounding the core-mounted conductor; and a cooling fluid chamber defining a passageway for circulating a cooling fluid through the link in a direction substantially parallel with a direction of current flow through the core-mounted conductor, wherein the link is openable to receive the loop and closable to substantially surround the loop.

16. A coupling link comprising:

a core-mounted conductor for surrounding a portion of a conductor loop coupled to a power source or a load, the core-mounted conductor for coupling to the other of the power source or the load;

a magnetic core at least partially surrounding the core-mounted conductor; and a cooling fluid chamber defining a passageway for circulating a cooling fluid through the link in a direction substantially parallel with a direction of current flow through the core-mounted conductor, wherein the link is separable into at least two link segments pivotally connected for opening to receive and disengage the loop, and for pivotally closing to engage the loop.

17. A coupling link, comprising:

a core-mounted conductor for surrounding a portion of a conductor loop coupled to a power source or a load, the core-mounted conductor for coupling to the other of the power source or the load;

a magnetic core at least partially surrounding the core-mounted conductor; and a cooling fluid chamber defining a passageway for circulating a cooling fluid through the link in a direction substantially parallel with a direction of current flow through the core-mounted conductor, wherein the link is separable into at least two link segments which are radially openable for disengaging the loop and radially closable for engaging the loop in radial directions respectively away from and toward a longitudinal axis of the surrounded portion of the loop.

18. A coupling link, comprising:

a core-mounted conductor for surrounding a portion of a conductor loop coupled to a power source or a load, the core-mounted conductor for coupling to the other of the power source or the load;

a magnetic core at least partially surrounding the core-mounted conductor; and a cooling fluid chamber defining a passageway for circulating a cooling fluid through the link in a direction substantially parallel with a direction of current flow through the core-mounted conductor, wherein the link is separable into at least two link segments which are translationally openable for disengaging the loop and translationally closable for engaging the loop.

19. An electric vehicle adapted for receiving AC power from a primary converter outside the vehicle, the primary converter including a coupling link having a magnetic core and a core-mounted conductor at least partially surrounded by the magnetic core, the vehicle comprising:

a battery on board the vehicle; and an on-board charging system comprising:

a secondary converter for converting AC power into DC power for charging the battery;

a normal conductor loop for coupling to the secondary converter and sized for charging the battery at a normal rate;

an expedited charge conductor loop for coupling to the secondary converter for charging the battery at an expedited rate faster than the normal rate;

wherein each loop is shaped for being selectively surrounded by at least a portion of the coupling link's magnetic core and core-mounted conductor for transferring AC power to the secondary converter from the primary converter when coupled thereto by the loop; and wherein the secondary converter interchangeably receives either the normal loop or the expedited charge conductor loop for receiving charging power when coupled by the loop to a primary converter which is responsive to a charging signal.

20. An electric vehicle adapted for receiving AC power from a primary converter responsive to a charging rate indicator indicative of a selected battery charging rate, the primary converter including a coupling link having a magnetic core and a core-mounted conductor at least partially surrounded by the magnetic core, the vehicle comprising:

a battery on board the vehicle; and an on-board charging system comprising:

a secondary converter for converting AC power into DC power for charging the battery; and a normal conductor loop coupled to the secondary converter, with the loop shaped for being selectively surrounded by at least a portion of the coupling link's magnetic core and core-mounted conductor, with the loop transferring AC power to the secondary converter from the primary converter when coupled thereto by the loop, with the loop being sized for charging the battery at a normal rate;

a normal charging rate indicator for indicating to the primary converter that the battery is to be charged at the normal rate when coupled thereto by the normal loop;

an expedited charge conductor loop coupled to the secondary converter for charging the battery at an expedited rate faster than the normal rate; and an expedited charging rate indicator carried by the expedited charge conductor loop for indicating to the primary converter that the battery is to be charged at the expedited rate when coupled thereto by the expedited charge loop.

* * * * *